United States Patent
Harada et al.

(10) Patent No.: US 7,164,239 B2
(45) Date of Patent: Jan. 16, 2007

(54) DISCHARGE LAMP BALLAST CIRCUIT

(75) Inventors: Shigeki Harada, Tokyo (JP); Kikuo Izumi, Tokyo (JP); Akihiko Iwata, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/039,869

(22) Filed: Jan. 24, 2005

(65) Prior Publication Data

US 2005/0179406 A1    Aug. 18, 2005

(30) Foreign Application Priority Data

Feb. 17, 2004   (JP) ............... 2004-040324

(51) Int. Cl.
*H05B 37/02*   (2006.01)

(52) U.S. Cl. .................... 315/224; 315/209 CD; 315/291

(58) Field of Classification Search ............ 315/209 R, 315/224–226, 209 CD, 246, 291, DIG. 7
See application file for complete search history.

(56) References Cited

U.S. PATENT DOCUMENTS

| 6,392,364 B1* | 5/2002 | Yamamoto et al. ......... 315/291 |
| 6,392,365 B1* | 5/2002 | Zhou et al. ................. 315/291 |
| 2005/0007034 A1* | 1/2005 | Kobayashi et al. ......... 315/291 |

FOREIGN PATENT DOCUMENTS

| JP | 2002-352989 | 12/2002 |
| JP | 2003-77691  | 3/2003  |

* cited by examiner

*Primary Examiner*—Thuy Vinh Tran
(74) *Attorney, Agent, or Firm*—Oblon, Spivak, McClelland, Maier & Neustadt, P.C.

(57) ABSTRACT

A discharge lamp ballast circuit is provided which can prolong the life of a discharge lamp, and reduce the size and cost of the ballast circuit. It generates from an AC voltage boosted by a DC-AC inverter circuit a DC voltage higher than the breakdown voltage of an HID lamp, or a superimposed voltage in which a pulsating component is superimposed on the DC voltage, and starts the discharge by applying the DC voltage or the superimposed voltage to the HID lamp. It can make the life of the HID lamp longer than that of the case where a high voltage short pulse is applied to the HID lamp.

4 Claims, 6 Drawing Sheets

DISCHARGE LAMP BALLAST CIRCUIT

BACKGROUND OF THE INVENTION

1. Field of the Invention

The present invention relates to a discharge lamp ballast circuit for controlling lighting of a discharge lamp such as an HID (High Intensity Discharge) Lamp.

2. Description of Related Art

It is necessary for vehicle-mounted HID lamps, for example, to produce a breakdown by applying a short pulse voltage of about 20 kV to start a discharge.

As for a conventional discharge lamp ballast circuit, a built-in igniter generates a high short pulse voltage, and supplies it to the HID lamps.

The built-in igniter of the conventional discharge lamp ballast circuit has the following configuration.

Specifically, when the voltage across a capacitor connected in parallel with a spark gap exceeds the on-voltage of the spark gap, the spark gap is turned on.

Thus, a pulse current flows through the primary winding of an igniter transformer, which produces a short high voltage pulse of about 20 kV across the secondary winding, there by applying the short high voltage pulse to the electrodes at both ends of the HID lamps (see, Relevant Reference 1, for example).

Relevant Reference 1: Japanese patent application laid-open No. 2002-352989 (paragraphs [0014] and [0015], and FIG. 1)

With the foregoing configuration, the conventional discharge lamp ballast circuit can start the discharge of the HID lamps by applying the high voltage (short pulse voltage) of about 20 kV to the HID lamps. However, since it must apply the high voltage every time to start the HID lamps, it has a problem of wearing the electrodes of the HID lamps by sputtering, and hence shortening their life.

In addition, the igniter transformer of the igniter must have a large turn ratio for producing the high voltage of about 20 kV, and have a high dielectric withstand voltage between windings. This presents a problem of hindering reduction in size and cost.

Furthermore, to achieve the start of the HID lamps without fail at the first attempt, it is necessary to use a highly reliable spark gap, which prevents an increase in yields and reduction in cost of the component.

Incidentally, the conventional discharge lamp ballast circuit turns on the lamp at a low frequency of 400 Hz to circumvent the problem of acoustic resonance. Consequently, as a device connected in series with the lamp for generating the ignition voltage, it can use only a reactance that can transfer energy at a low frequency.

SUMMARY OF THE INVENTION

The present invention is implemented to solve the foregoing problems. It is therefore an object of the present invention to provide a discharge lamp ballast circuit capable of increasing the life of a discharge lamp, and of reducing the size and cost of the ballast circuit.

According to one aspect of the present invention, there is provided a discharge lamp ballast circuit including an igniter for generating from the AC voltage boosted by an inverter a DC voltage higher than a breakdown voltage of a discharge lamp, or a superimposed voltage in which a pulsating component is superimposed on the DC voltage, and for supplying the discharge lamp with the DC voltage or superimposed voltage to start discharge.

According to the present invention, the discharge lamp ballast circuit is configured such that it generates from the AC voltage boosted by the inverter the DC voltage higher than the breakdown voltage of the discharge lamp, or the superimposed voltage in which the pulsating component is superimposed on the DC voltage, and supplies the discharge lamp with one of the DC voltage and the superimposed voltage to start discharge. Thus, it offers an advantage of being able to lengthen the life of the discharge lamp, and to reduce the size and cost of the ballast circuit.

DETAILED DESCRIPTION OF THE PREFERRED EMBODIMENTS

The invention will now be described with reference to the accompanying drawings.

Embodiment 1

Figure 1:
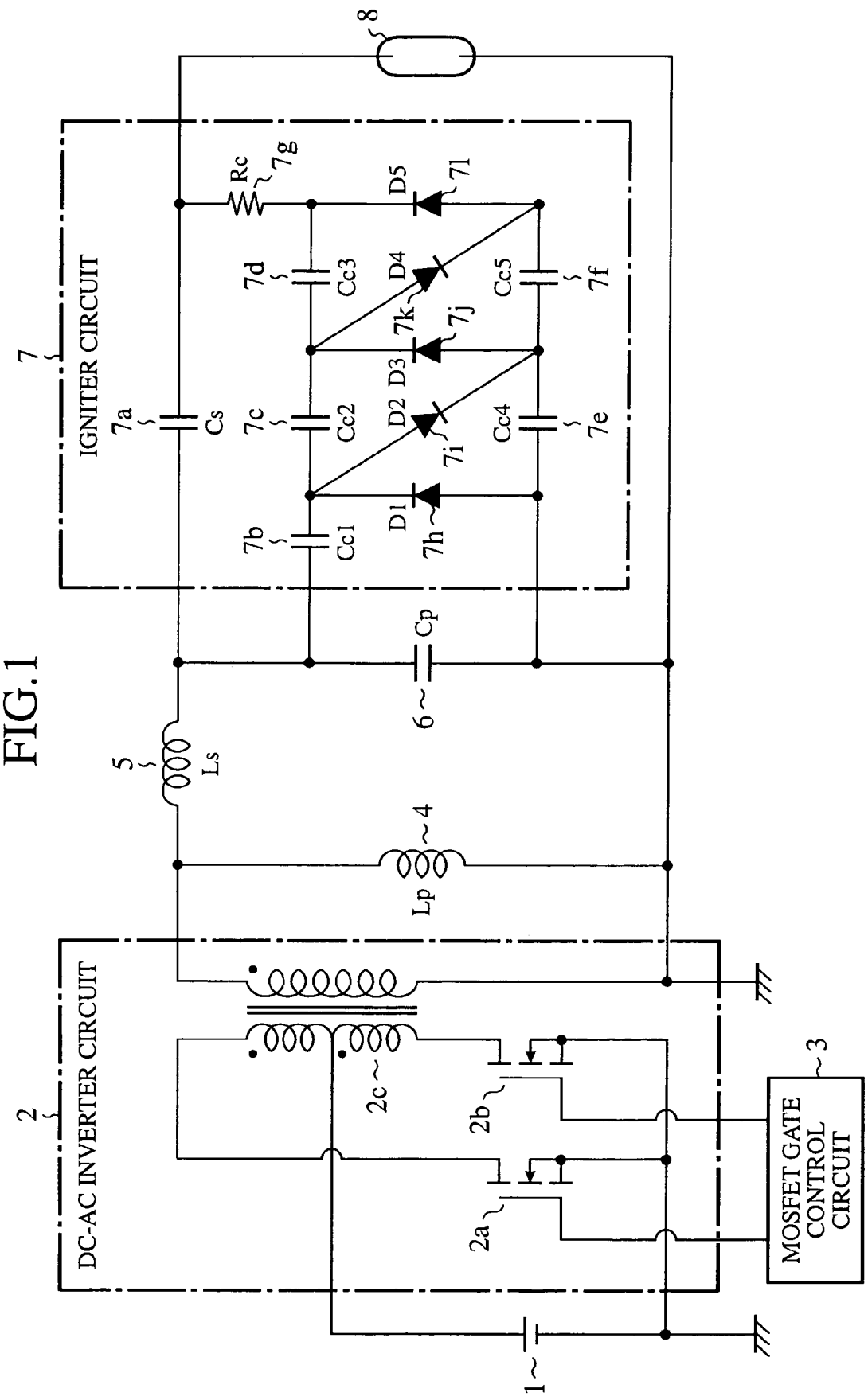
FIG. 1 is a circuit diagram showing a configuration of a discharge lamp ballast circuit of an embodiment 1 in accordance with the present invention.

FIG. 1 is a circuit diagram showing a configuration of a discharge lamp ballast circuit of an embodiment 1 in accordance with the present invention. In FIG. 1, a DC power supply 1 generates a DC voltage of 12 volts, for example, and has its minus potential side connected to a ground.

A DC-AC inverter circuit (inverter) 2 converts the DC voltage generated by the DC power supply 1 to an AC voltage, and boosts the AC voltage. The DC-AC inverter circuit 2 includes MOSFETs 2a and 2b which are switching devices configured in a half bridge, and a pulse transformer 2c with a turn ratio of 1:23, for example.

A MOSFET gate control circuit 3 controls the operation frequency and duty of the MOSFETs 2a and 2b in the DC-AC inverter circuit 2 in response to the state of an HID lamp 8.

A reactor 4, a first reactor (called "reactor Lp" from now on), is connected in parallel with the secondary side of the pulse transformer 2c in the DC-AC inverter circuit 2. A reactor 5, a second reactor (called "reactor Ls" from now on), has its first end connected to an end of the reactor Lp. A capacitor 6, a second capacitor (called "capacitor Cp" from now on), has its first end connected to a second end of the reactor Ls, and its second end connected to a second end of the reactor Lp and a second end of the HID lamp 8.

An igniter circuit (igniter) 7 includes a Cockcroft-Walton circuit for generating from the AC voltage boosted by the DC-AC inverter circuit 2 a DC voltage higher than the breakdown voltage of the HID lamp 8, and supplies the DC voltage to the HID lamp 8 to bring about the discharge.

A capacitor 7a, a first capacitor (called "capacitor Cs" from now on), which constitutes part of the igniter circuit 7, has its first end connected to the second end of the reactor Ls, and its second end connected to a first end of the HID lamp 8.

To boost the voltage across the capacitor Cp, the igniter circuit 7 includes besides the capacitor Cs five capacitors 7b, 7c, 7d, 7e and 7f (called "capacitor Cc1", "capacitor Cc2", "capacitor Cc3", "capacitor Cc4" and "capacitor Cc5" from now on); five diodes 7h, 7i, 7j, 7k and 7l (called "diode D1", "diode D2", "diode D3", "diode D4" and "diode D5" from now on); and one resistor 7g (called "resistor Rc" from now on).

Here, the capacitance of the capacitor Cs is 3 nF, the capacitance of the capacitors Cc1-Cc2 is 500 pF, and the resistance of the resistor Rc is 500 kΩ.

In the example of FIG. 1, the reactor Lp, reactor Ls, capacitor Cp and capacitor Cs constitute a resonant circuit that resonates in response to the load of the HID lamp 8.

Here, the inductance of the reactor Lp is 0.25 mH, the inductance of the reactor Ls is 0.3 mH, and the capacitance of the capacitor Cp is 3 nF.

The HID lamp 8 is a discharge lamp that starts discharge when a voltage greater than the breakdown voltage is applied.

Next, the operation will be described.

The MOSFET gate control circuit 3 controls the operation frequency and duty of the MOSFETs 2a and 2b in the DC-AC inverter circuit 2 in response to the state of the HID lamp 8.

More specifically, the HID lamp 8 has its resistance vary according its state from a non-lighting state to a steady discharge state. Consequently, the input power to the HID lamp 8 must be varied in response to the state of the HID lamp 8. Thus, the MOSFET gate control circuit 3 controls the MOSFETs 2a and 2b in response to the state of the HID lamp 8. The operation of the HID lamp 8 from a ballast start time to the steady discharge period will be described in more detail later.

The MOSFETs 2a and 2b of the DC-AC inverter circuit 2 repeat turning on and off under the control of the MOSFET gate control circuit 3 to convert the DC voltage generated by the DC power supply 1 to the AC voltage, and boosts the AC voltage.

The igniter circuit 7 generates from the AC voltage boosted by the DC-AC inverter circuit 2 a DC voltage higher than the breakdown voltage of the HID lamp 8, or a superimposed voltage in which a pulsating component is superimposed on that DC voltage, and starts the discharge by applying the DC voltage or the superimposed voltage to the HID lamp 8.

In this case, the resonant circuit including the reactor Lp, reactor Ls, capacitor Cp and capacitor Cs resonates at the driving frequency of the MOSFETs 2a and 2b to reduce the loss due to the resistance components on the primary side of the pulse transformer 2c in the DC-AC inverter circuit 2.

Next, the operation will be described in sequence from the ballast start of the HID lamp 8 to the steady discharge period.

A. Discharge Waiting Period

When a driver of an automobile gives a lighting command of the HID lamp 8, for example, the MOSFET gate control circuit 3 supplies the MOSFETs 2a and 2b in the DC-AC inverter circuit 2 with gate signals so that the MOSFETs 2a and 2b begin to repeat switching on and off.

Thus, the DC voltage produced by the DC power supply 1 is converted into the AC voltage, and the pulse transformer 2c in the DC-AC inverter circuit 2 generates the AC voltage on the secondary side higher than the AC voltage on the primary side of the pulse transformer 2c by a factor of the turn ratio.

During the discharge waiting period, since the HID lamp 8 has a high resistance of about 2 MΩ across the electrodes, the capacitor Cs is concealed from the DC-AC inverter circuit 2.

Accordingly, the resonant circuit is composed of the reactor Ls and the capacitor Cp.

Figure 2:
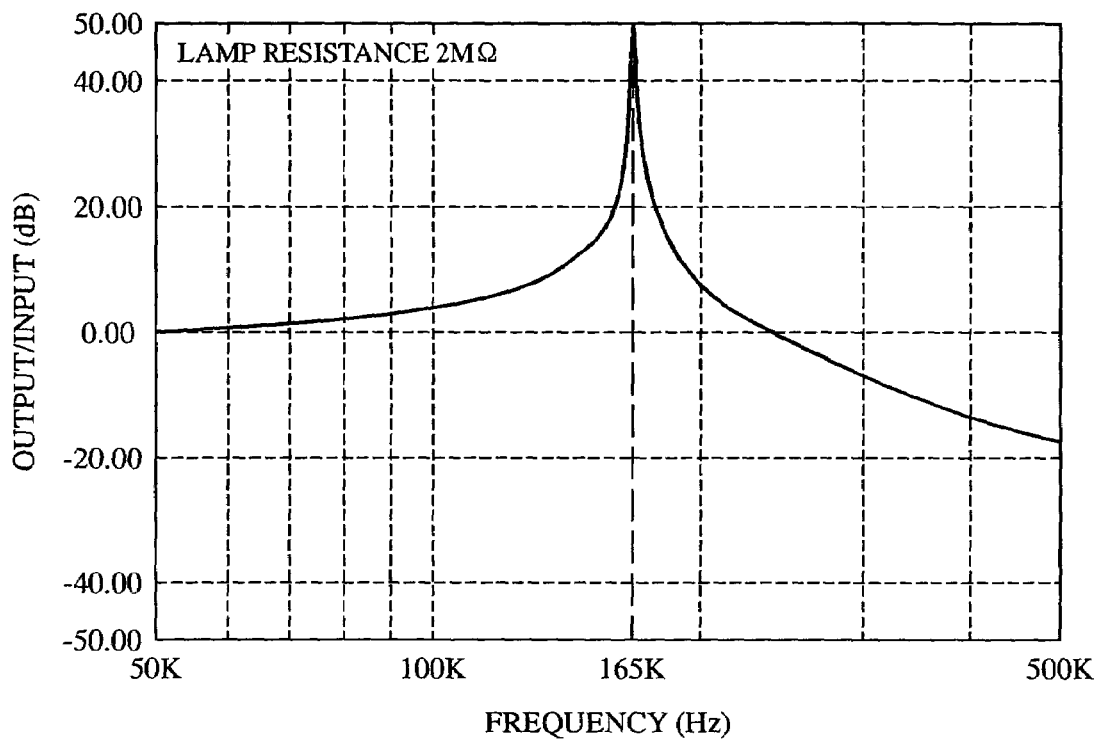
FIG. 2 is a graph illustrating a driving frequency and a gain as the ratio of output to input when the lamp resistance of the HID lamp is 2 M{fourth root}.

FIG. 2 is a graph illustrating a driving frequency and a gain as the ratio of output to input when the lamp resistance of the HID lamp is 2 MΩ. As clearly seen from FIG. 2, the AC voltage generated on the secondary side of the pulse transformer 2c can be boosted by the resonance by setting the operation frequency of the MOSFETs 2a and 2b at about the resonance frequency of 165 kHz.

In the example of FIG. 1, considering the withstand voltage of the capacitor Cp, the operation frequency and duty of the MOSFETs 2a and 2b are determined such that the voltage across the capacitor Cp becomes 2 kV or less with zero-peak.

The AC voltage of ±2 kV across the capacitor Cp is boosted by a factor of five by the igniter circuit 7, and appears as a DC voltage of 10 kV across the capacitor Cs. Thus, the HID lamp 8 is supplied with the superimposed voltage in which the ±2 kv pulsating voltage is superimposed on the 10 kV DC voltage. Incidentally, in the present specification, the DC voltage to be applied to the HID lamp 8 includes such a superimposed voltage.

As for the resistance of the resistor Rc connected to the output side of the igniter circuit 7, it is determined by considering the following two points.

(1) At the start of the HID lamp 8, the total voltage across the capacitors Cc1, Cc2 and Cc3 is applied across the capacitor Cs and resistor Rc. Accordingly, it is preferable that the resistance of the resistor Rc be as small as possible from the viewpoint that the voltage across the capacitor Cs is placed as high as possible.

(2) During the steady discharge, unless the resistor Rc is inserted, and when the voltage is in the polarity that causes a forward current to flow through the diodes D1–D5, the HID lamp 8 is not supplied with the voltage because of the current flowing through the diodes D1–D5. To prevent this, it is necessary for the resistor Rc to have a resistance sufficiently greater than the load of the HID lamp 8.

Considering the these items (1) and (2), the present embodiment 1 sets the resistance of the resistor Rc at 500 kΩ.

Incidentally, the capacitors Cc1, Cc2 and Cc3 connected in series can be connected to the HID lamp 8 in series instead of the capacitor Cs at the place of the capacitor Cs to supply the HID lamp 8 with a DC potential. In this case, the capacitor Cs and resistor Rc can be removed, thereby reducing the number of components. In addition, since the total voltage across the capacitors Cc1, Cc2 and Cc3 is directly applied to the HID lamp 8, the efficiency of applying the voltage to the HID lamp 8 is better. Because of these advantages, it appears that such a configuration is preferable.

However, the configuration of the present embodiment 1 has the advantage in the flexibility of the circuit design and in the size and cost of the components because of the following reasons.

First, the capacitance of the capacitor Cs connected to the HID lamp 8 in series is designed such that it constitutes a resonant circuit, and is 3 nF in the present embodiment 1. To implement the capacitance by three capacitors connected in series, three 9 nF capacitors are required, which increases the size and cost of the components. In addition, as for the capacitance of the capacitors of the Cockcroft-Walton, it is set at optimum values for the DC voltage to rise at a desired time period (too quick rise can place extra demands on the power supply, and too slow rise can deteriorate the response of the lighting). It is 500 pF in the present embodiment 1. In summary, it is necessary for the capacitors Cc1, Cc2 and Cc3 to be set at 9 nF to meet the resonance characteristics, and at 500 pF to optimize the rising time of the DC voltage, which are not compatible. Thus, the flexibility of the circuit design is deteriorated. Consequently, the configuration using the capacitor Cs and resistor Rc is a very important matter.

B. Discharge Start Period

Figure 3:
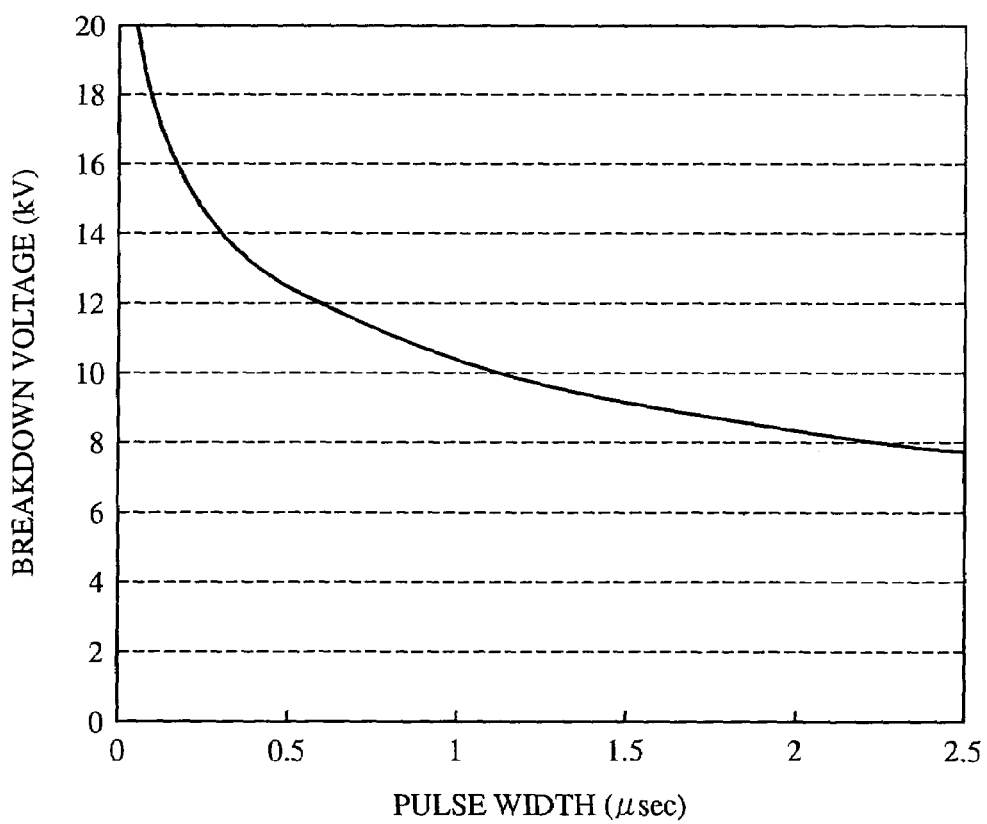
FIG. 3 is a graph illustrating relationships between the pulse width of the voltage applied to the HID lamp and the breakdown voltage of the HID lamp.

FIG. 3 is a graph illustrating relationships between the pulse width of the voltage applied to the HID lamp 8 and the breakdown voltage of the HID lamp 8.

It is clearly seen from FIG. 3 that the breakdown voltage of the HID lamp 8 is reduced as the pulse width of the voltage is increased, and that the breakdown occurs when the voltage applied to the HID lamp 8 exceeds 8 kV.

Conventionally, since a pulse voltage with a narrow width is applied, a high voltage of about 20 kV must be applied, which wears out the electrodes of the HID lamp 8 because of sputtering. In contrast with this, to reduce the wearing out of the electrodes of the HID lamp 8 due to the sputtering, the present embodiment 1 supplies the HID lamp 8 with a DC pulse voltage of 10 kV or less with a sufficient pulse width, thereby producing the breakdown of the HID lamp 8.

More specifically, receiving the AC voltage boosted by the DC-AC inverter circuit 2, the igniter circuit 7 generates from the AC voltage the DC voltage (DC voltage equal to or less than 10 kV) exceeding the breakdown voltage of the HID lamp 8, and supplies the DC voltage to the HID lamp 8.

C. Transient Discharge Period

The HID lamp 8 such as a metal halide lamp includes xenon, mercury and metal halide, and depending on the energy (such as intra-tube pressure and temperature) injected after the breakdown, the xenon, mercury and metal halide discharge successively and contribute to the lighting.

Finally, the vapor of the metal halide grows to a sufficient pressure and reaches the steady discharge. Until reaching the steady discharge, the lamp passes through a transient discharge period in which the discharge is unstable.

In the transient discharge period, it is necessary to continuously supply sufficient energy for a short time period to prevent the discharge from being extinguished.

In particular, when turning on the lamp again about 10 seconds after the turn off (called "10 second hot condition"), the discharge is easy to be extinguished.

In the 10 second hot condition, the lamp resistance of the HID lamp 8 during the discharge transient period is considered to be about 500 Ω. To positively continue the discharge, it is necessary to inject 400 W or more energy instantaneously.

Figure 4:
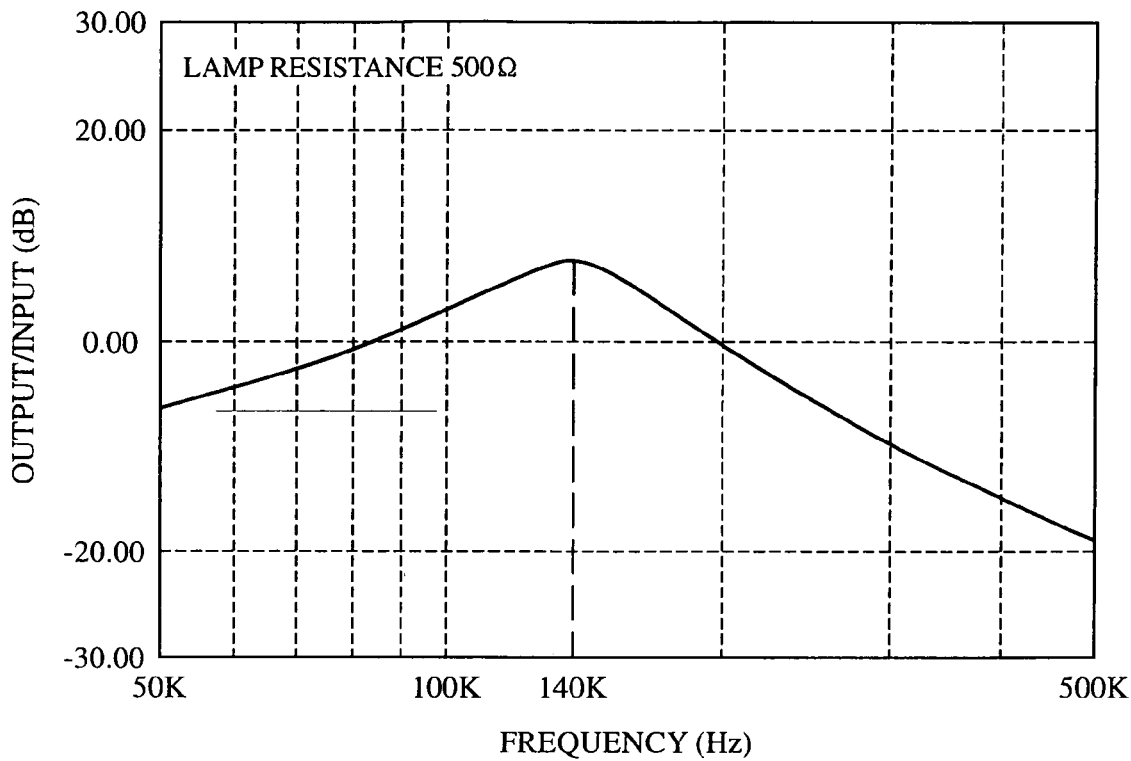
FIG. 4 is a graph illustrating a driving frequency and a gain as the ratio of output to input when the lamp resistance of the HID lamp is 500 Ω.

FIG. 4 is a graph illustrating the driving frequency and the gain as the ratio of output to input when the lamp resistance of the HID lamp 8 is 500 Ω. It is clearly seen from FIG. 4 that a high output can be obtained from the secondary side of the pulse transformer 2c by setting the operation frequency of the MOSFETs 2a and 2b at about the resonance frequency of 140 kHz, and that the discharge can be maintained by injecting the energy of 400 W or more instantaneously.

D. Steady Discharge Period

During the steady discharge, the HID lamp 8 is driven at 90 kHz to avoid acoustic resonance.

During the steady discharge, the lamp resistance of the HID lamp 8 is about 200 Ω. In this case, the MOSFET gate control circuit 3 controls the duty of the MOSFETs 2a and 2b so that the rated power of 35 W is output at that lamp resistance of the HID lamp 8.

Figure 5:
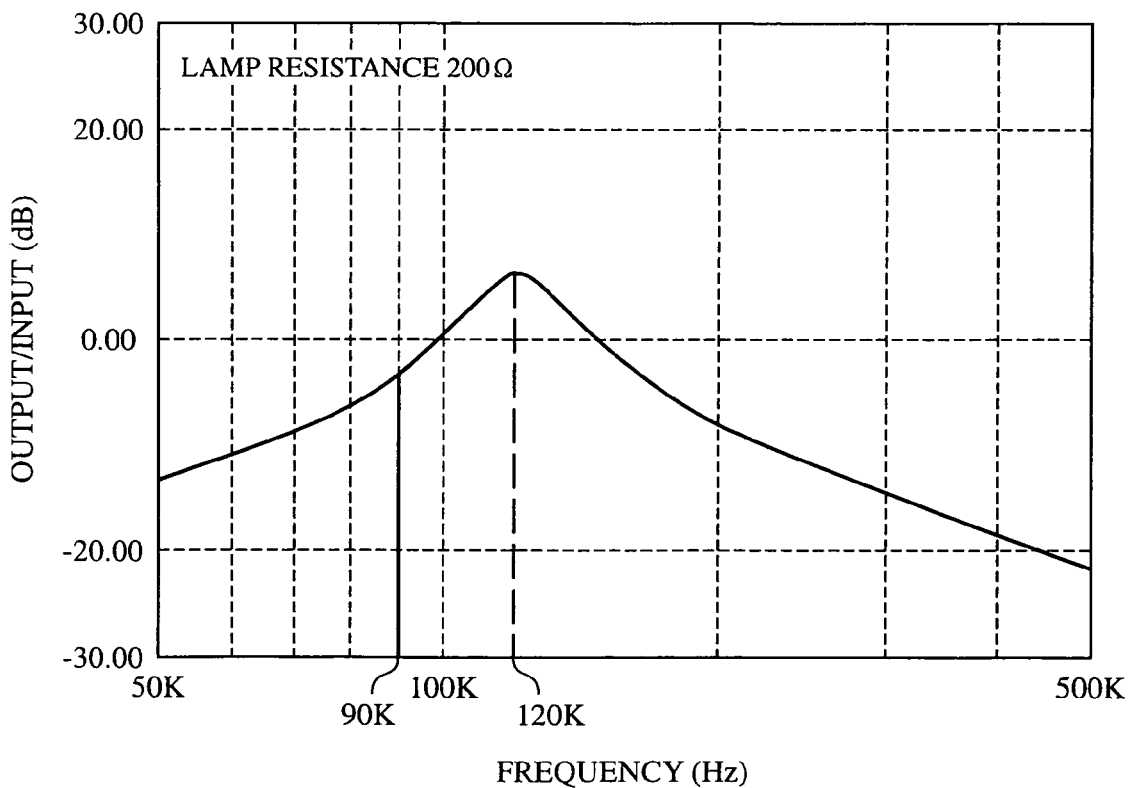
FIG. 5 is a graph illustrating the relationships between a driving frequency and a gain as the ratio of output to input when the lamp resistance of the HID lamp is 200 Ω.

FIG. 5 is a graph illustrating the relationships between the driving frequency and the gain as the ratio of output to input when the lamp resistance of the HID lamp 8 is 200 Ω.

The components involved in the resonance characteristics of the lamp resistance of the HID lamp 8 are reactor Ls, capacitor Cp and capacitor Cs, and it is seen from FIG. 5 that the resonance point is placed at 120 kHz.

Since the driving frequency of the MOSFETs 2a and 2b is 90 kHz, the impedance on the load side when looking from the input side is seen as a capacitive load.

Without the reactor Lp, since the impedance on the load side is seen as a capacitive load, the current flowing through the primary side when the MOSFETs 2a and 2b are in the conduction state has a high peak value, and a large current effective value. Accordingly, the power loss of the resistance components on the primary side is increased.

The reactor Lp is connected to reduce the loss on the primary side by producing the parallel resonance at 90 kHz with the combined impedance of the reactor Ls, capacitor Cp and capacitor Cs.

Figure 6:
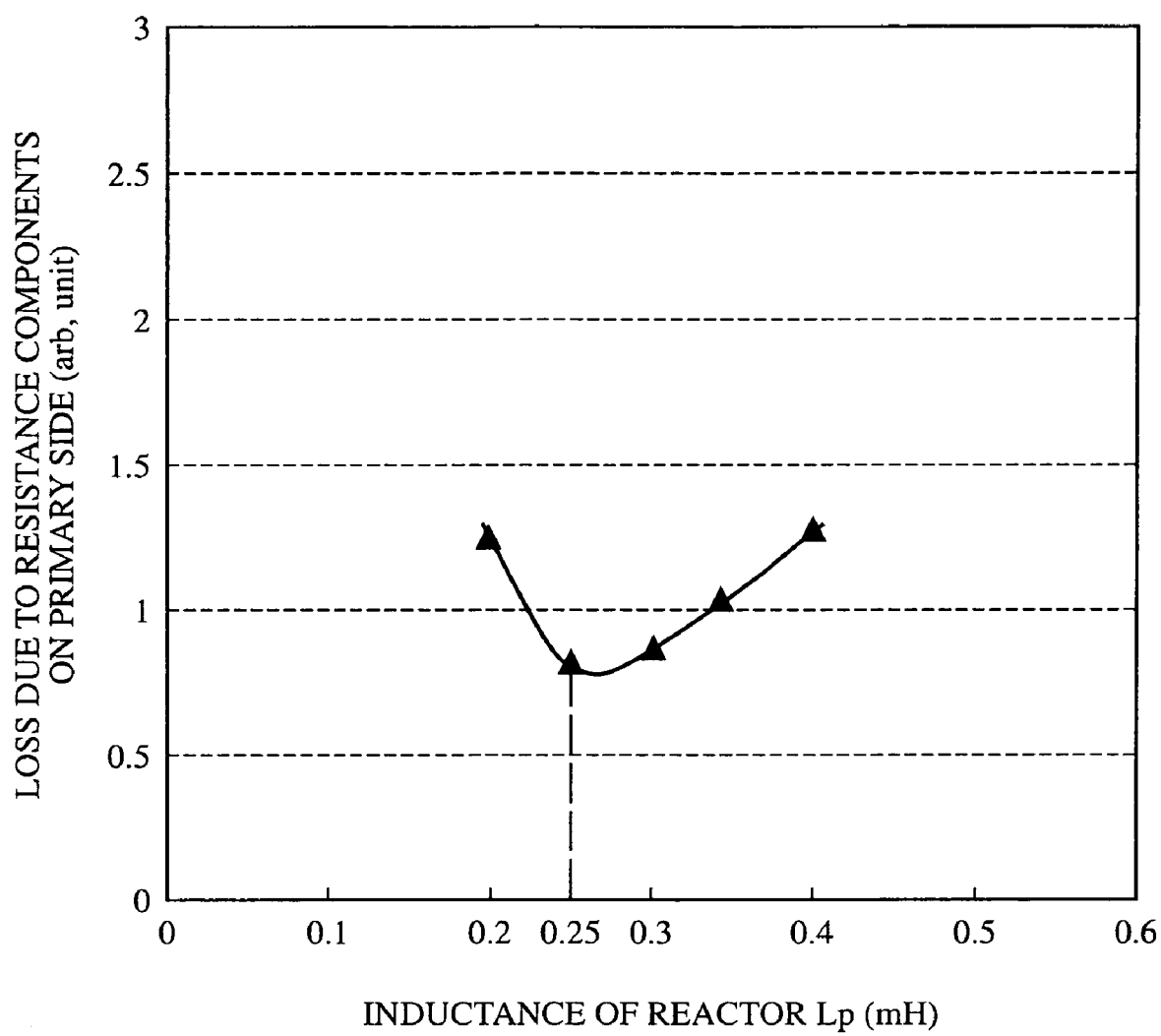
FIG. 6 is a graph illustrating the effect of a reactor Lp.

FIG. 6 is a graph illustrating the effect of the reactor Lp. FIG. 6 illustrates the relationships between the reactor Lp and the loss due to the primary side resistance components when Cp=3 nF, Cs=3 nF and Ls=0.3 mH.

The loss becomes minimum when Lp=0.25 mH. More specifically, when the reactor Lp is 0.25 mH, its combined impedance with the reactor Ls, capacitor Cp and capacitor Cs has the resonance frequency matching the driving frequency of 90 kHz, thereby satisfying the conditions of the parallel resonance and achieving the minimum loss.

Thus, the HID lamp 8 can operate properly from the discharge start to the steady discharge by establishing a sequence with varying the driving frequency and duty of the MOSFETs 2a and 2b in response to the changes in the lamp resistance of the HID lamp 8 through the discharge waiting period→discharge start period→transient discharge period→steady discharge period.

Here, the description of the acoustic resonance will be added.

Generally, the acoustic resonance occurs when the ballast frequency of the lamp is set at a few kilohertz or more, and brings about a problem of flicker or extinction of the lamp. However, a particular frequency is present that does not cause the acoustic resonance even at a high frequency. In addition, by devising the waveform such as modulating the driving frequency, it is possible to achieve the normal ballast even at a high frequency. As a result of optimizing the conditions such as the frequency and ballast waveform, the present embodiment 1 can ballast the lamp at 90 kHz.

Furthermore, as for the key point of the present embodiment 1 that the energy is transmitted to the lamp in the state in which the capacitor Cs is connected in series with the lamp, it is because the lamp is ballasted at a high frequency of 90 kHz. Since the conventional low frequency ballast cannot transmit energy, the capacitor Cs cannot be connected in series to the lamp. Accordingly, the conventional low frequency ballast cannot achieve ignition by the DC potential.

As described above, the present embodiment 1 is configured such that the DC-AC inverter circuit 2 generates from the boosted AC voltage the DC voltage higher than the breakdown voltage of the HID lamp 8, and starts the discharge by applying the DC voltage to the HID lamp 8. Thus, it offers an advantage of being able to make the life of the HID lamp 8 longer than the case where the short high voltage pulse is applied to the HID lamp 8.

In addition, it offers an advantage of being able to reduce the size and cost of the igniter because the igniter transformer and spark gap are not necessary to produce the short high voltage pulse.

According to the present embodiment 1, the resonant circuit including the reactor Lp, reactor Ls, capacitor Cp and capacitor Cs carries out parallel resonance. Accordingly, it offers an advantage of being able to reduce the loss due to the resistance components on the primary side of the pulse transformer 2*c* in the DC-AC inverter circuit 2.

Embodiment 2

Although the foregoing embodiment 1 is described by giving concrete values of the constants of the components, it is obvious that any other constants can be used as long as a similar operation is performed.

In addition, although the foregoing embodiment 1 is described by way of example in which the HID lamp 8 is a vehicle-mounted metal halide lamp with a rating of 35 W, it is obvious that the present invention is applicable to the HID lamp 8 with a different rating.

Furthermore, although the igniter circuit 7 including the Cockcroft-Walton circuit is used as a means for generating the DC voltage, it is obvious that other circuits can be used to produce the DC voltage.

Embodiment 3

Figure 7:
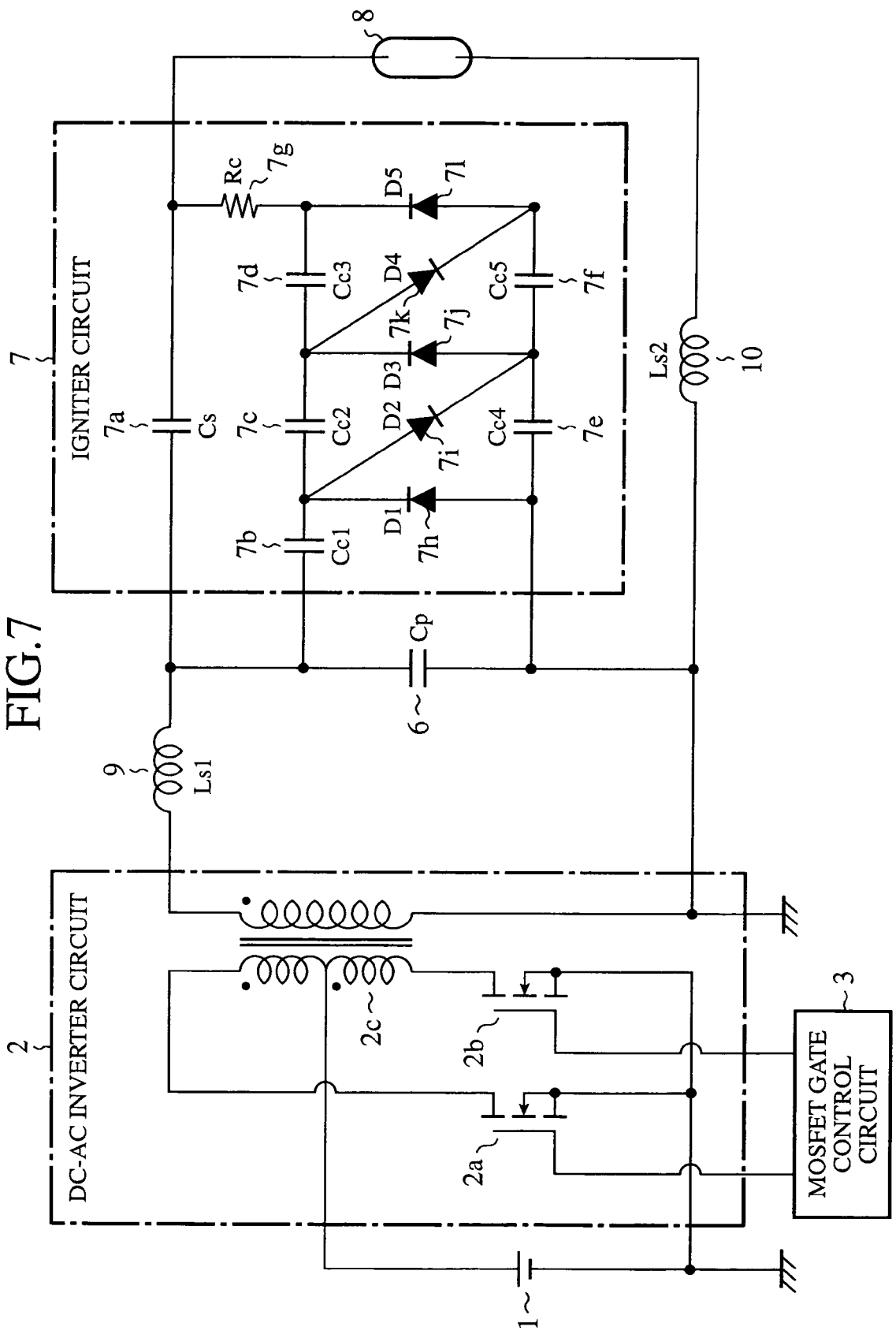
FIG. 7 is a circuit diagram showing a configuration of a discharge lamp ballast circuit of an embodiment 3 in accordance with the present invention.

FIG. 7 is a circuit diagram showing a configuration of a discharge lamp ballast circuit of an embodiment 3 in accordance with the present invention. In FIG. 7, the same reference numerals designate the same or like portions to those of FIG. 1, and their description will be omitted here.

A reactor 9, a first reactor (called "reactor Ls1" from now on), has its first end connected to a first output end of the secondary side of the pulse transformer 2*c* in the DC-AC inverter circuit 2.

A reactor 10, a second reactor (called "reactor Ls2" from now on), has its first end connected to the second end of the capacitor Cp, and its second end connected to the second end of the HID lamp 8.

Figure 8:
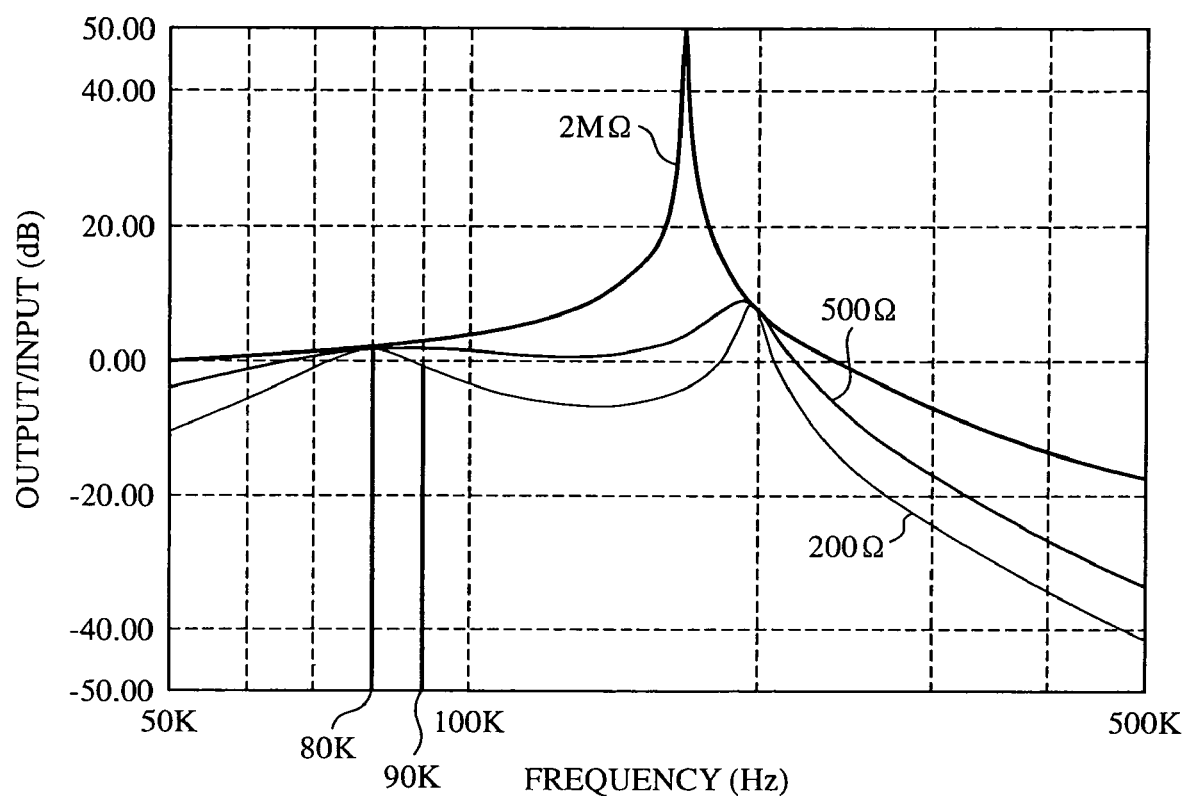
FIG. 8 is a graph illustrating resonance characteristics of the embodiment 3 in accordance with the present invention.

FIG. 8 is a graph illustrating resonance characteristics of the embodiment 3 in accordance with the present invention. It differs from the foregoing embodiment 1 in that it does not use the parallel resonance. More specifically, it has the 1-mH reactor Ls2 connected in series with the HID lamp 8. Here, the reactor Ls1=0.3 mH, capacitor Cp=3 nF and capacitor Cs=3 nF are the same as those of the foregoing embodiment 1.

When the resistor of the HID lamp 8 is 200 Ω, the resonance frequency is placed at 80 kHz. Accordingly, when the MOSFETs 2*a* and 2*b* are driven at 90 kHz, the impedance of the secondary side of the pulse transformer 2*c* in the DC-AC inverter circuit 2 becomes an inductive load. As a result, the loss of the primary side of the pulse transformer 2*c* is reduced.

As for the value of the reactor Ls2, it is nearly the same as that of the conventional igniter transformer. However, since it is enough for the reactor Ls2 to withstand the voltage of about 10 kV rather than the high voltage equal to or greater than about 20 kV, the design of the withstand voltage is easier, which enables the reduction in the size and cost.

As for the advantage of reducing the loss due to the resistance components of the primary side of the pulse transformer 2*c* in the DC-AC inverter circuit 2, it is substantially the same as that of the foregoing embodiment 1.

What is claimed is:

1. A discharge lamp ballast circuit comprising:
   an inverter for converting a DC voltage to an AC voltage, and for boosting the AC voltage;
   an igniter for generating from the AC voltage boosted by said inverter a DC voltage higher than a breakdown voltage of a discharge lamp, or a superimposed voltage in which a pulsating component is superimposed on the DC voltage, and for supplying the discharge lamp with one of the DC voltage and the superimposed voltage to start discharge; and
   a resonant circuit that is connected to an output side of the inverter, and resonates in response to a load of the discharge lamp,
   wherein said resonant circuit comprises:
   a first reactor connected in parallel with the output side of the inverter;
   a second reactor having its first end connected to a first end of said first reactor;
   a first capacitor having its first end connected to a second end of said second reactor, and its second end connected to a first end of the discharge lamp; and
   a second capacitor having its first end connected to the second end of said second reactor, and its second end connected to a second end of said first reactor and to a second end of said discharge lamp.

2. The discharge lamp ballast circuit according to claim 1, wherein the igniter comprises a Cockcroft-Walton circuit.

3. A discharge lamp ballast circuit comprising:
   an inverter for converting a DC voltage to an AC voltage, and for boosting the AC voltage;
   an igniter for generating from the AC voltage boosted by said inverter a DC voltage higher than a breakdown voltage of a discharge lamp, or a superimposed voltage in which a pulsating component is superimposed on the DC voltage, and for supplying the discharge lamp with one of the DC voltage and the superimposed voltage to start discharge; and
   a resonant circuit that is connected to an output side of the inverter, and resonates in response to a load of the discharge lamp,
   wherein said resonant circuit comprises:
   a first reactor having its first end connected to a first output end of said inverter;
   a first capacitor having its first end connected to a second end of said first reactor, and its second end connected to a first end of the discharge lamp;
   a second capacitor having its first end connected to the second end of said first reactor, and its second end connected to a second output end of said inverter; and
   a second reactor having its first end connected to the second end of said second capacitor, and its second end connected to a second end of said discharge lamp.

4. The discharge lamp ballast circuit according to claim 3, wherein the igniter comprises a Cockcroft-Walton circuit.

* * * * *